United States Patent [19]

Keller

[11] Patent Number: 4,847,614

[45] Date of Patent: Jul. 11, 1989

[54] ELECTRONIC REMOTE CONTROL MEANS, ESPECIALLY FOR CENTRALLY CONTROLLED LOCKING SYSTEMS IN MOTOR VEHICLES

[75] Inventor: Herbert Keller, Übersee, Fed. Rep. of Germany

[73] Assignee: Wilhelm Ruf KG, Munich, Fed. Rep. of Germany

[21] Appl. No.: 101,635

[22] Filed: Sep. 28, 1987

[30] Foreign Application Priority Data

Oct. 29, 1986 [DE] Fed. Rep. of Germany ....... 3636822

[51] Int. Cl.[4] ........................ H04Q 7/00; G08C 19/00

[52] U.S. Cl. ...................... 340/825.560; 340/825.720; 340/825.310

[58] Field of Search ...................... 340/825.56, 825.31, 340/825.72; 361/172, 171; 235/382.5

[56] References Cited

U.S. PATENT DOCUMENTS 4,509,093 4/1985 Stellberger .................... 340/825.31
4,723,121 2/1988 Van den Boom et al. .... 340/825.31

FOREIGN PATENT DOCUMENTS 3234538 3/1984 Fed. Rep. of Germany .
3320721 12/1984 Fed. Rep. of Germany .
3407436 8/1985 Fed. Rep. of Germany .
3407469 9/1985 Fed. Rep. of Germany .
3244049 6/1986 Fed. Rep. of Germany .

*Primary Examiner*—Donald J. Yusko
*Attorney, Agent, or Firm*—Helfgott & Karas

[57] ABSTRACT

The electronic remote control means operates according to the known principle of code stepping through which a different code word is used after each transmitting/receiving operation. In accordance with the invention the respective new code word is produced anew by linking according to a given function, starting from a stored original code word and the previous code word. In case of non-agreement between the code word received and the new code word determined at the receiver additional code words are produced in sequence at the receiver. Thereafter, if no agreement results, the receiver switches over to an increased security mode wherein two successive code words in sequence must be successfully compared.

9 Claims, 4 Drawing Sheets

ELECTRONIC REMOTE CONTROL MEANS, ESPECIALLY FOR CENTRALLY CONTROLLED LOCKING SYSTEMS IN MOTOR VEHICLES

FIELD OF THE INVENTION

The instant invention relates to an electronic remote control means, especially for centrally controlled locking systems in motor vehicles, comprising a transmitter acting as key and a receiver acting as lock, the transmitter, when actuated, emitting a code word in the form of encoded signals (bit sequence), the code words being different and one ahead of a sequenced amount of code words per actuation, and the receiver, when receiving a formally valid word, similarly holding ready a comparative code word from the sequenced amount of code words for comparison with the code word emitted by the transmitter and generating an actuating signal if those words are in agreement.

BACKGROUND OF THE INVENTION

A remotely operable and centrally controllable locking system for motor vehicles of the kind mentioned above with which the same series of code bits each is stored in the transmitter and in the receiver, said series representing a number of sequenced code words each including a plurality of bits, is known from German Pat. No. 32 44 049. With each actuation of the transmitter, the code bits in the transmitter and receiver are stepped ahead by a constant number of bit positions corresponding to the length of a code word. When the last word is reached, switch-back is effected to the first word. Following each actuation, a check is made to see whether there is agreement between the code word transmitted and the actual code word which is up in the receiver. If there is agreement, the door is opened. Synchronization between the transmitter and the receiver is an absolute must with this system. If the synchronization should have got lost, such as by actuating the transmitter outside of the range of the receiver (so-called dummy operation), agreement can no longer be found. Thus the known system provides for reestablishing synchronization between the transmitter and receiver to a given word if a special key is pressed.

It is a disadvantage of this system that the demand for storage room in the transmitter and receiver depends directby on the number of possible combinations. It is useful, for reasons of security, to provide the greatest possible number of code words so as to obtain a very long cycle of repetition of the code words. Otherwise unauthorized "bugging" of the code might make it too easy to crack the code. What is particularly critical in respect of the security against interception is the synchronization command. If an unauthorized person finds out the code of the synchronization command, all that is required to be known is the code word which is obtained as synchronization is established. It is no longer necessary to find out the entire bit sequence.

Thus the advantage in safety offered by a permanently changing code (so-called forward stepping of the code) is greatly reduced by the need for synchronization which, in the final analysis, cancels the code stepping ahead. This becomes particularly evident when looking at the limit value. If synchronization is effected with each transmission, it is seen that a variable code and synchronization are contradictory.

The principle of forward stepping of the code is known also from DE-OS No. 33 20 721. In that case additional data are transmitted together with each word emitted and those data contain information as to the code number to be selected from the supply memorized in the receiver. Again synchronization is required between the transmitter and the receiver. It is suggested as a means of increasing the security that resynchronization should be possible only in the direction toward higher code numbers, whereby any codes recorded without authorization are deprived of their value. Moreover, the receiver is to accept resynchronization only in a very limited interval of code numbers. Still synchronization data are passed along the transmission path and, therefore, may be recorded.

The difficulties of synchronization with forward stepping of codes are described also in the laid-open German patent applications DE-OS Nos. 32 34 538, 34 07 436, and 34 07 469.

SUMMARY OF THE INVENTION

It is an object of the invention to improve an electronic remote control means of the kind recited initially such that it affords improved security while requiring little memory space for the sequenced amount of code words.

This object is met, in accordance with the invention, in a control means of the generic type in question in that a new code word is produced by linking according to a given function, with every stepping, in the transmitter and receiver alike, starting from a common original code word, and that the receiver, in forward stepping, produces further code words in case of non-agreement between the code word received and the comparative code word, and compares them with the code word received, the number of steps taken and the comparisons made, however, being no more than a predetermined maximum number n.

Advantageous modifications and further developments of the invention may be gathered from the claims.

Briefly stated, the invention also operates according to the principle of stepping one ahead of the code. Yet only very little memory space is needed as the individual code words are constantly being determined anew from a single original code word. This offers an enormously great number of possible combinations. Moreover, with the invention the transmitter and receiver need not be rigidly synchronized. Instead, the receiver synchronizes itself automatically with the transmitter. This requires no external measures to be taken by the user. In principle, any "pseudo random generator" may be used as the given function for the linking, provided the "random sequence" is clearly defined so that two independent pseudo random generators in a transmitter/receiver pair will generate the same random sequence.

In addition to further improve the security, a feature is provided wherein if anybody without authorization tries to open the lock with a wrong code, a switchover to higher safety level takes place. If the probability of finding the correct code word is $\frac{1}{2}^{n}$, it becomes $\frac{1}{2}^{2n}$ in the case of the increased security. It should be noted that this may result in a condition where the increased safety measure of double word agreement will be applied constantly.

A feature wherein the necessary new code words needed for the forward stepping of the code without having to memorize all of them is also provided. In this case the additional security features may be provided to prevent the code from being cracked by employing the condition of a control bit or a predetermined number of shifts to enable Exclusive Or linking.

Utilizing the highest order bit as the control bit ensures that the transmitter and the receiver cannot be influenced by external transmitters to such an extent that their code stepping is so far apart that they cannot get together again.

External systems, such as keys of other types of cars operating according to the same principle can also be prevented from releasing any code forward stepping in the receiver. Furthermore it becomes possible to provide a plurality of independent functions, such as opening and closing of the door, switching on and off additional warning means, etc. Finally, different types of keys may be provided for each transmitter and receiver pair to achieve varying functions, as already is the case with mechanical car door keys. For example, one key will lock only the doors but not the trunk, whereas a second key will lock only the trunk but not the doors and a third key will serve to operate all locks.

Yet another feature permits automatic resynchronization in the complete code supply even if the transmitter and receiver are apart by more than m+n steps. The forward stepping of the code may be interrupted after m+n steps by the control means in accordance with the features previously noted. Then the user must open the door with a mechanical key. To permit synchronization even in those cases which, for example, occur by failure of the power supply in the transmitter or receiver, the full code supply is scanned if two criteria are fulfilled (e.g. lock open *plus* ignition switched on). In this manner synchronous running between transmitter and receiver is reestablished reliably although this takes a little more time.

BRIEF DESCRIPTION OF THE DRAWING

The invention will be described further, by way of example, with reference to the accompanying drawings in which.

DESCRIPTION OF PREFERRED EMBODIMENTS

Figures 1A, 1B:
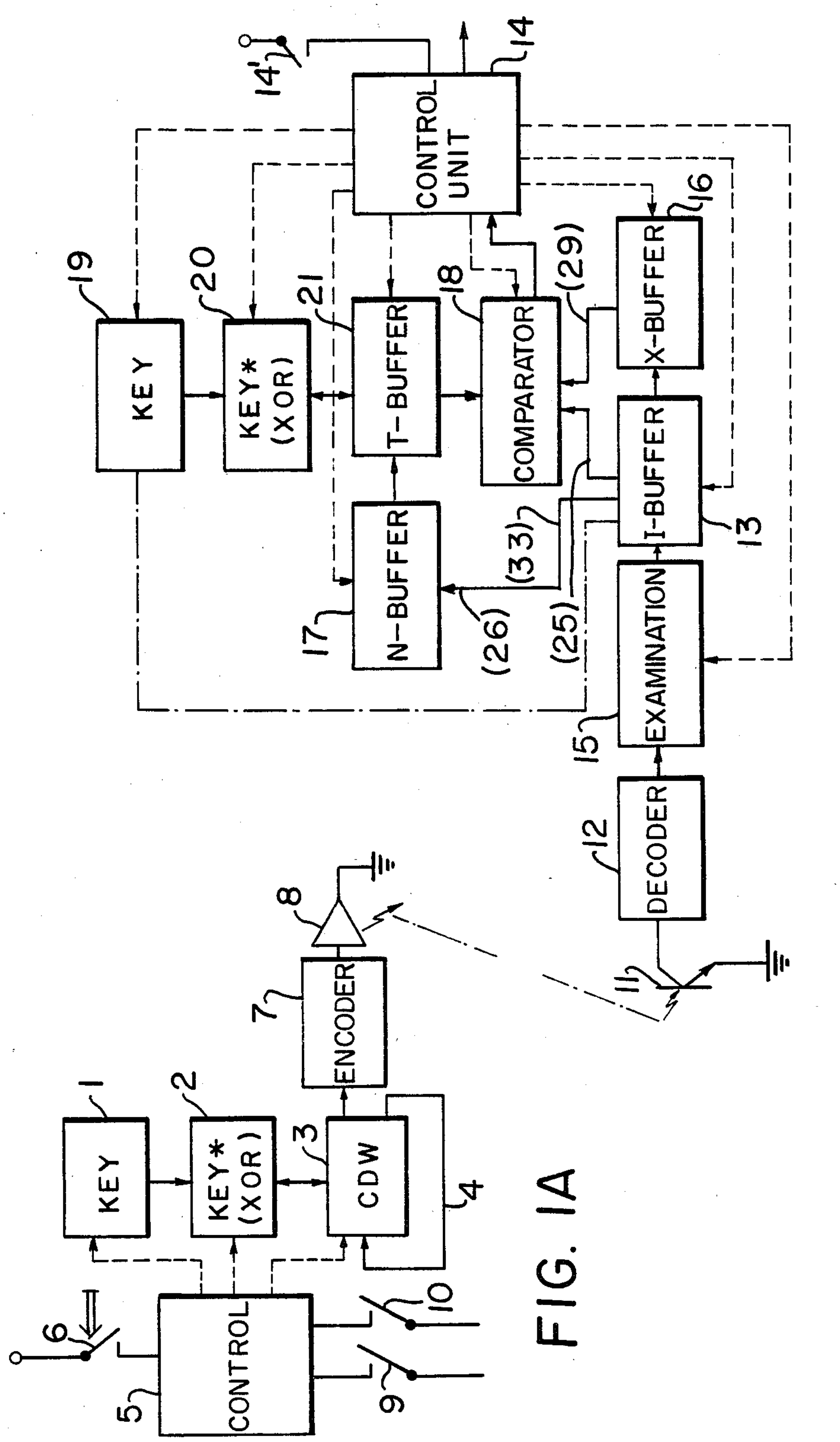
FIG. 1A is a block diagram of the transmitter.
FIG. 1B is a block diagram of the receiver.

The transmitter shown in FIG. 1A comprises a first memory 1 in which an original code word referred to below as "key code word" is memorized. This memory 1 may be embodied by fixed wiring although a programmable memory, especially an EEPROM is preferred. Fundamentally, the key code word may be of any desired length. For purposes of explanation of a concrete embodiment it is assumed that this key code word has a length of 32 bits. It is organized such that 24 bits thereof are the actual key code word associated individually with each transmitter/receiver pair, while the other 8 bits are so-called system bits which may be drawn upon for different discriminations, such as:

(a) characterization of types of keys having different closing functions, such as door locks alone, door locks and trunk, etc.

(b) characterizations of systems, such as make of the car, key system (c) functions to be released, such as opening/closing, etc.

(d) control bits (e) parity check bit, etc.

The memory 1 is connected to a circuit 2 which generates an actual code word (subsequently referred to as CDW) from the key code word according to a given logical function. This actual code word then is stored in another memory 3. In a preferred embodiment of the invention the circuit 2 is realized by a chain of exclusive-OR gates which produce a new code word according to the method of the polynomial generator or polynomial ring, based on the key code word alone or from the key code word and the previous CDW. The operation of the polynomial ring will be explained first by a simplified example with which the CDW is determined from the key code word alone.

It is assumed that an initial word (key code word) "0110" is memorized in a feedback shift register including 4 bit positions. An exclusive-OR gate is connected between the first and second bit positions (as seen from the right) to link the actual bit positions of the first and second bits and to enter the result of this combination into the first bit position, whereupon all bit positions are shifted to the right by one position and the first bit position takes the place of the fourth bit position. This will provide the following sequence of events:

| Bit position: 4321 | |
|---|---|
| CDW 0 | 0110 |
| CDW 1 | 0011 |
| CDW 2 | 1000 |
| CDW 3 | 0100 |
| CDW 4 | 0010 |
| CDW 5 | 0001 |
| CDW 6 | 1001 |
| CDW 7 | 1101 |
| CDW 8 | 1111 |
| CDW 9 | 1110 |
| CDW 10 | 0111 |
| CDW 11 | 1010 |
| CDW 12 | 0101 |
| CDW 13 | 1011 |
| CDW 14 | 1100 |
| CDW 15(0) | 0110 |
| CDW 16(1) | 0011 |
| etc. | |

The polynomial ring thus has 15 different states. With this example the originally memorized key code word is changed continually. If the linking or the law of the formation of the "sequence" is known, the next CDW may be determined, starting from any desired CDW. Thus it is still relatively easy to decipher this code. Furthermore, it may be gathered from the above table that from CDW 2 to CDW 5 it is only the one "1" which moves from the left to the right. Now if any unauthorized person takes up CDW 2 and CDW 3, he can conclude rather easily what CDW 4 and CDW 5 are. At certain points in the course of this forward stepping the code thus can be cracked especially easily. For this reason the invention further provides that the linking takes place only if a certain bit acting as a control bit carries a logical "1". For example, the highest order bit (bit position 4 in the above table) is selected for this purpose. True, this shortens the polynomial ring. But it is more difficult to find out the law of formation from which conclusions may be drawn from one code word CDW x to the next code word CDW x+1.

A much better variant of the principle of the polynomial generator is applied with the embodiment shown in FIG. 1: the key code word remain unchanged and an exclusive-OR linking between the bits of the key code word and those of the previous CDWs takes place bit position for bit position. Thus even if the law of the formation of the sequence and the former CDW are known, the new CDW cannot be determined without the knowledge of the key code word.

A modification of the invention provides that the exclusive-OR linking with the corresponding bit position of the CDW takes place only at those positions at which the key code word carries a logical "1". This will be explained with reference to an example of a word having a length of 16 bits:

| | |
|---|---|
| key code word: | 1010100011100110 |
| last CDW (x−1): | 0110010101001011 |
| XOR if key=1: | x x x   xxx   xx |
| key (XOR) CDW: | 1100110110101101 |
| shifting to the right by one position = new CDW (x): | 1110011011010110 |

It can be shown that hereby the CDW varies continually. Applying this type of linking and starting from certain key code words, all possibilities of combination are passed before one of the possible combinations is repeated the second time. At a length of the key code word plus CDW of 32 bits, consequently the number of possibilities is $2^{32}=4.29\times10^9$. With some key code words (e.g. 000000 . . . 00) or types of linking the "polynomial ring" does not pass all possibilities of combination, in other words, the polynomial ring is shortened. Yet this has no significance as regards the basic principle of the invention. Having accomplished the linking, the CDW in memory 3 is shifted by one bit position, the last bit taking the place of the first position. This is demonstrated by line 4. These operations take place under the control of a control unit 5 which provides the necessary clock frequencies and the individual control signals. If the user presses a key 6, a transmitting cycle is released with which a new CDW is generated in the manner described above. Under the control of control unit 5 this new CDW then is read serially from memory 3 and applied to a transmitting unit 8 by way of an encoder 7 including a modulator and an amplifier. In the present case the transmitting unit is a light emitting diode operating in the infrared range.

In the case of a modification of the invention the CDW is formed merely by linking with the key code word proper, while the other system bits each are emitted unchanged. Several variants are possible within the limits of this modification, namely:

(1) The system bits are transmitted in time before the CDW.

(2) The system bits are transmitted in time after the CDW.

(3) The system bits partly are transmitted before and partly after the CDW.

(4) The system bits are transmitted nested within the CDW.

The embodiment illustrated in FIG. 1A includes further switches 9 and 10 connected to the control unit. Further functions, such as the opening or closing of a door etc. may be selected by way of these switches. If one of these switches is actuated, all that is changed is one or more system bits, while the sequence of operations otherwise is carried out unchanged.

The light emitted by the transmitting unit in the form of a LED is transmitted in the form of coded light pulses. In this case, for example, a pulse spacing modulation may be selected at which the spacing between adjacent light pulses is of different length in the case of a logical "1" and a logical "0" (cf. FIG. 4). It is obvious that other known methods of modulation may be applied as well. These light pulses are detected in the receiver (FIG. 1B) by a photosensor 11, then decoded and amplified in a pulse enhancing unit 12 and subsequently checked under the control of a control unit 14 to see whether the pulse sequence can be a valid CDW at all in consideration of its format. What is examined in this context, for instance, is: the number of bits, the minimum duration of a pause after the last bit received, conformity of certain system bits, etc. This examination is carried out in a unit 15. If the result is positive, the CDW received is entered into a receiving buffer memory 13 (I buffer). Under continued control of the control unit 14, the next successive CDW then is determined in the same manner as with the transmitter and subsequently entered into a temporary memory 21 (T buffer). Subsequently the content of the T buffer 21, i.e. the actual code word generated in the receiver, and the word received and memorized in the I buffer 13, i.e. the word furnished by the transmitter, are compared in a comparator 18. If the two words are in agreement, the control unit 14 is informed thereof and thereupon provides an actuating signal, for example, a door opening signal.

The receiver likewise comprises a memory 19 for the key code word as well as a possibility of linking 20 (in this case an exclusive-OR gate) to generate the actual CDW. Fundamentally, the mode of operation in the receiver to produce the actual CDW is the same as that of the transmitter.

During normal operation both the transmitter and the receiver are stepped forward by one code word following each actuation. They may also be said to be running in synchronism.

However, it is possible for the transmitter and the receiver "to get out of step". This may have one of the following possible causes:

(a) The transmitter is actuated and thus the forward stepping of the code takes place outside of the range of the receiver (so-called dummy operation).

(b) The receiver is stepped ahead by a foreign key having the same system (for example in a parking lot).

(c) The receiver is stepped ahead by unauthorized attempts at opening.

(d) Power failure in the transmitter or receiver, followed by resetting of volatile memories.

As the most frequent case happening in practice is the dummy operation of the transmitter, special attention will be paid to this event. The corresponding features of the invention will be explained with reference to FIG. 2. Let us assume that the transmitter and the receiver have moved from their original state (CDW 0) in unison up to any desired CDW x. By dummy operation of the transmitter, the transmitter then is shifted to CDW x+1 while the receiver still remains at CDW x. Thus the transmitter is one step ahead (or several steps) of the receiver. Now, if the receiver still being at CDW x receives CDW x+1, the comparator 18 detects that agreement is missing. Consequently the lock is not opened. Thereupon, however, the control unit 14 causes the stepping ahead of the code in the receiver so that the next successive code words are determined progressively in the receiver up to a maximum given number n, in other words code words CDW x to CDW x+n. In a practical embodiment the number n will be selected in the order of ten steps. If agreement is determined within this sequence of n steps (code words CDW x to CDW x+n) with the code word received (in this case: CDW x+1), the actuating signal is generated and the CDW at which agreement was achieved (in the instant case: CDW x+1) is memorized in the receiver in a memory 17 (N buffer) as the valid code word for the next actuations. As long as agreement is not determined, the respective actual CDW determined in the transmitter is memorized only in the T buffer 21. It is not until agreement exists that the content of the T buffer 21 is passed on into the N buffer 17. Then the N buffer 17 also may take over the CDW received from the I buffer 13.

It is obvious that the receiver in this context calculates so-called lost code words so that the transmitter and the receiver become synchronized automatically without any need for synchronization pulses to be passed along the transmission path where they might be recorded without authorization. The user does not take any notice of this synchronization.

It may happen that the transmitter has suffered more than a number n of dummy operations. No agreement is determined within the number n of CDWs calculated in the receiver (CDW x to CDW x+n). In accordance with another feature of the invention the receiver then switches over to increased security at which two directly successive CDWs must be conform.

A number m of further code words are determined (CDW x+n to CDW x+n+m), where m is greater than n (e.g. m=256). When the receiver is switched to this operating state, the user must press a key twice on his transmitter. The possibilities of combination in that case correspond to those of a word including $2\times32=64$ bits, i.e. there are approximately $1.8\times10^{19}$ possibilities. If double agreement is determined within the sequence CDW x+n to CDW x+n+m, again the actuating signal is furnished and the last CDW received is taken over into the N buffer 17. If, on the other hand, agreement is missing in this case too, the attempt at opening has failed and the lock must be opened, for instance, by means of a mechanical key. The last CDW received is transferred from the I buffer 13 into another receiving memory 16 (X buffer).

Figure 2:
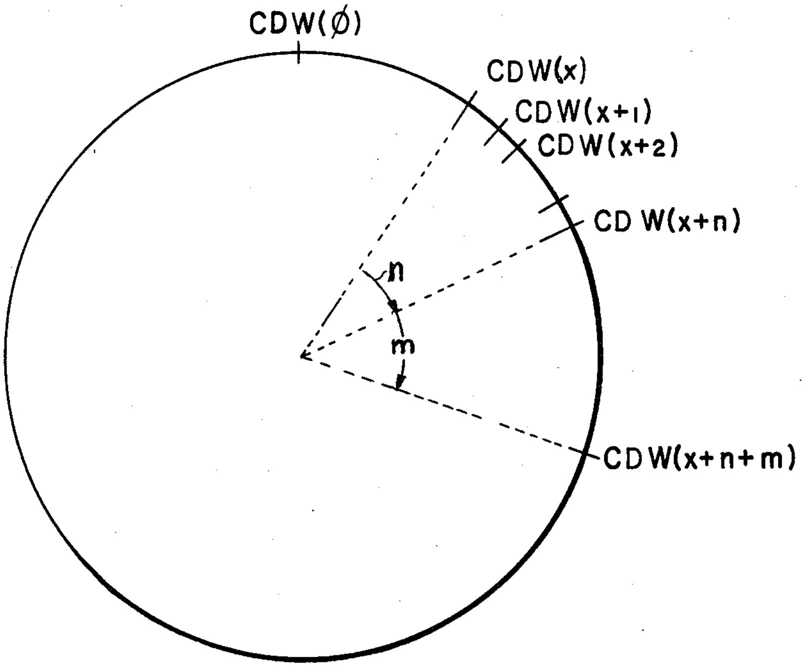
FIG. 2 is a circular diagram of the forward stepping of the code to explain the mode of operation of the invention.

In accordance with the features of the invention described above, automatic resynchronization thus may take place only in sectors n and m of FIG. 2. Yet failure of the power supply in the transmitter or receiver may cause them to be so far apart, depending on the previous history, i.e. the number of previous actuations, that they no longer lie within the sectors mentioned. In accordance with a modification of the invention to be described in greater detail with reference to FIG. 3A, resynchronization still is possible even in that case. For reasons of security against unauthorized opening, resynchronization in the normal case is to be effected only in a limited range (n+m) in order to prevent any unauthorized person from simply running through all possibilities by means of a function generator. Furthermore, the numbers n and m should not be selected to be too great in order not to block the receiver too long if unauthorized attempts at opening are made. In order still to achieve resynchronization in the case explained above, the invention provides for the number m to be unlimited if two criteria are fulfilled. These criteria preferably are:

1. door lock (opened by a mechanical key) and
2. further criterion, e.g. ignition of the car switched on.

If the door lock cannot be opened electronically in spite of having actuated the transmitter key twice, the user must open the door lock mechanically, switch on the ignition and then again press the transmitter key. Now the receiver will calculate all the code possibilities until agreement is found. In the extreme case this may be the full circle shown in FIG. 2. If one takes into consideration an average of ten actuations of a car lock per day, no more than 36500 code steppings are made in the course of ten years. This is a relatively small number compared to the $4.2\times10^9$ theoretical steppings ahead of the code which are possible with a CDW including 32 bits. In other words, even after ten years of operation the receiver and the transmitter still will be relatively close to CDW 0. It is recommended that the transmitter be reset into its original state, i.e. the condition of CDW 0 by briefly taking out its battery in order to avoid that the full circle according to FIG. 2 must be calculated. As the receiver on the whole has made only the rather small number of 36500 code steppings, the synchronization in this event is found more quickly than if the full circle of FIG. 2 has to be calculated.

It may also happen that a foreign transmitter has caused the number n and, in case of double actuation, even the number n+m of steps to have run out in the receiver. As this foreign transmitter, however, did not release any opening, the last conform word, i.e. CDW x still is available in the N buffer 17. Yet the receiver has switched over to the mode of operation of agreement of two successive words. Now if the correct transmitter provides the code word CDW x, the door still will not open. The user thus must actuate the transmitter again. Subsequently CDW x and CDW x+1 will agree as a pair, the door will open, and the code word CDW x+1 will be received in the N buffer 17.

In accordance with another variant of the invention the number n also may be set at zero. In this event the increased level of security always will be applied. It may also be provided that two successive CDWs each are determined and transmitted if the key 6 is actuated but once (FIG. 1A). In accordance with another feature of the invention both memories 1 and 19 for the key code word are embodied by EEPROMs (electrically erasable programmable memories). This has manufacturing advantages since all transmitters and receivers may be made of the same hardware and the key is programmed in a transmitter/receiver pair only when the hardware is finished. And besides, this also has an advantage in case the transmitter (key) should get lost. In that event it is not necessary to exchange the entire system. Rather, it is sufficient to buy a new transmitter (key) and to reprogram the receiver. Of course, this can be done only when the door is open. A switch 14' is used to change over the receiver to a "learning phase". The new transmitter once transmits the key code word which is entered into the key memory 19 of the receiver during this learning phase.

The flowchart of FIG. 3 again illustrates the steps taken, corresponding reference numerals of the steps being entered also in FIG. 1B. Having received a formally valid code word, the actual CDW (N buffer 17) is pushed into the T buffer 21 in step 22. Subsequently, in step 23, it is examined whether the system is at the more simple or the more complicated security. If it is at the lower level of security, the content of the T buffer 21 is linked, in step 24, with the content of the key memory 19, the result being the new CDW which is memorized in the T buffer 21. In the next step 25 it is checked whether this new CDW corresponds with the content of the I buffer 13. If so, step 16 causes the release of the desired function and the content of the I buffer 13 is received in the N buffer 17. If, on the other hand, the examination carried out in step 25 has a negative result, step 27 is taken to see whether or not the number n of attempts already have been made. If the result is negative, the loop returns to step 24, if the result is positive, changeover to increased security is effected in step 28.

If the system is at increased security when a valid code word is received, step 23 branches off to step 29 where it is examined whether the content of the T buffer 21 agrees with the content of the I buffer 13. If this is not the case, a new CDW is determined in step 30, and this process is repeated up to m times in step 31. If no agreement according to step 29 is achieved with all of these m attempts, the content of the I buffer 13 is taken over into the X buffer 16. If, on the other hand, the examination made in step 29 provides agreement, the next successive CDW is calculated in step 32 and, in step 33, it is checked whether also this new (second) CDW is in agreement with the content of the I buffer 13 determined during the second transmitting step. If this is so, again the desired function is released and, in step 26, switch-back is effected to simple security and, finally, also the content of the I buffer 13 is entered into the N buffer 17.

Figure 3A:
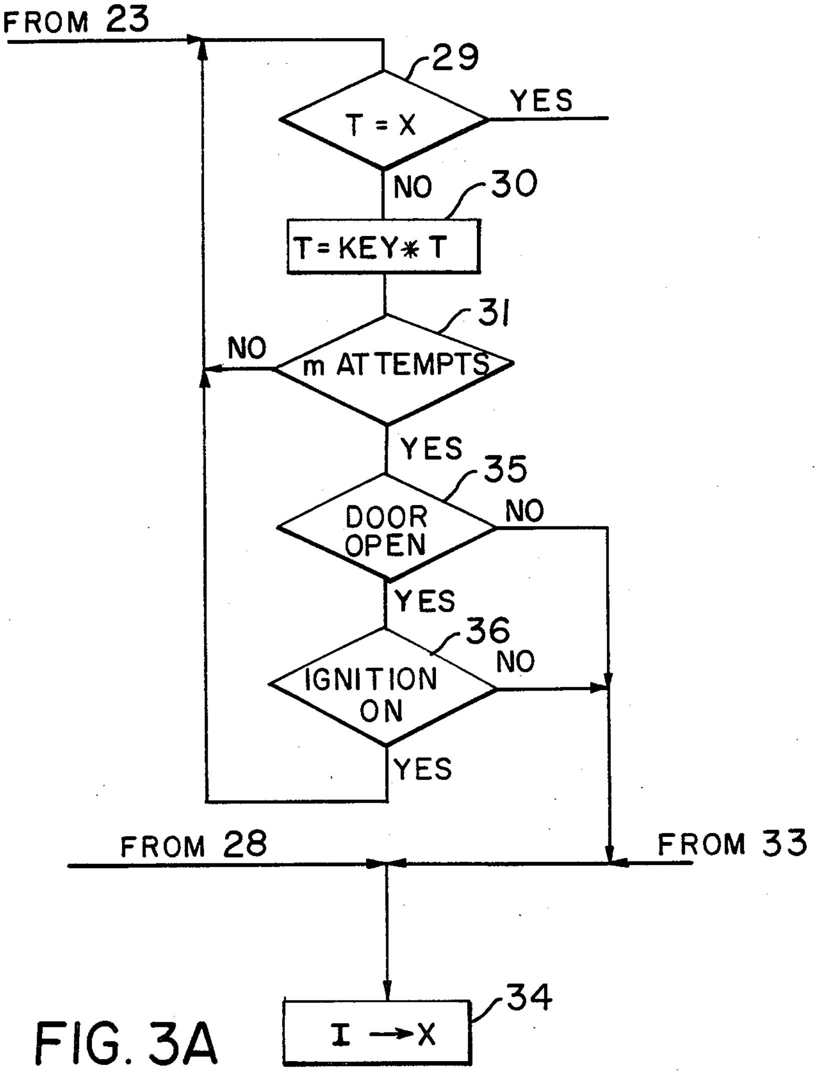
FIG. 3A is a section of the flowchart of FIG. 3 including an additional variant for automatic resynchronization.
Figure 3:
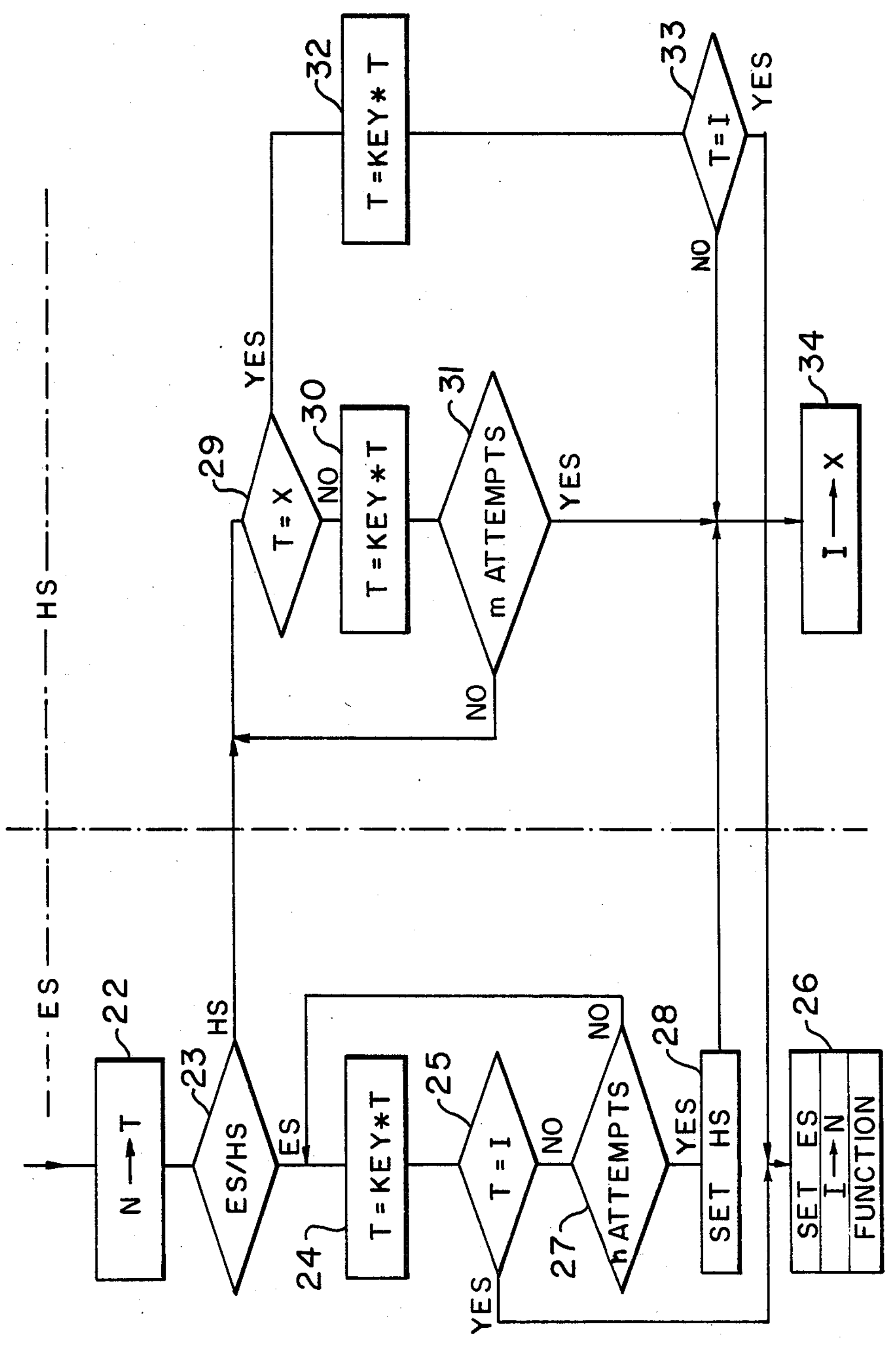
FIG. 3 is a flowchart to explain the functioning of the receiver.

FIG. 3A shows a section of the flowchart of FIG. 3 with the additional variant of resynchronization in the full code supply. When it is determined in step 31, in the case of the increased security, that the number of m attempts has run out, the variant shown in FIG. 3 provided for an interruption of the forward stepping of the code. It will no longer be possible to open the door. In the case of the variant according to FIG. 3A, on the other hand, it is examined in this case, in step 35, whether or not the door is open. If it is not, the stepping ahead of the code again is interrupted (step 34). However, if this is so, it is examined in step 36 whether or not the further criterion is fulfilled, in other words, whether the ignition is switched on. If this is not the case, again the course is interrupted (step 34). However, if this is so, the system returns to step 29. The loop including steps 29, 30, 31, 35, 36 then is passed as long as it takes to reach agreement. Consequently synchronous running is achieved reliably if the transmitter/receiver pair belongs together and operates properly.

Figures 4A, 4B, 4C, 4D:
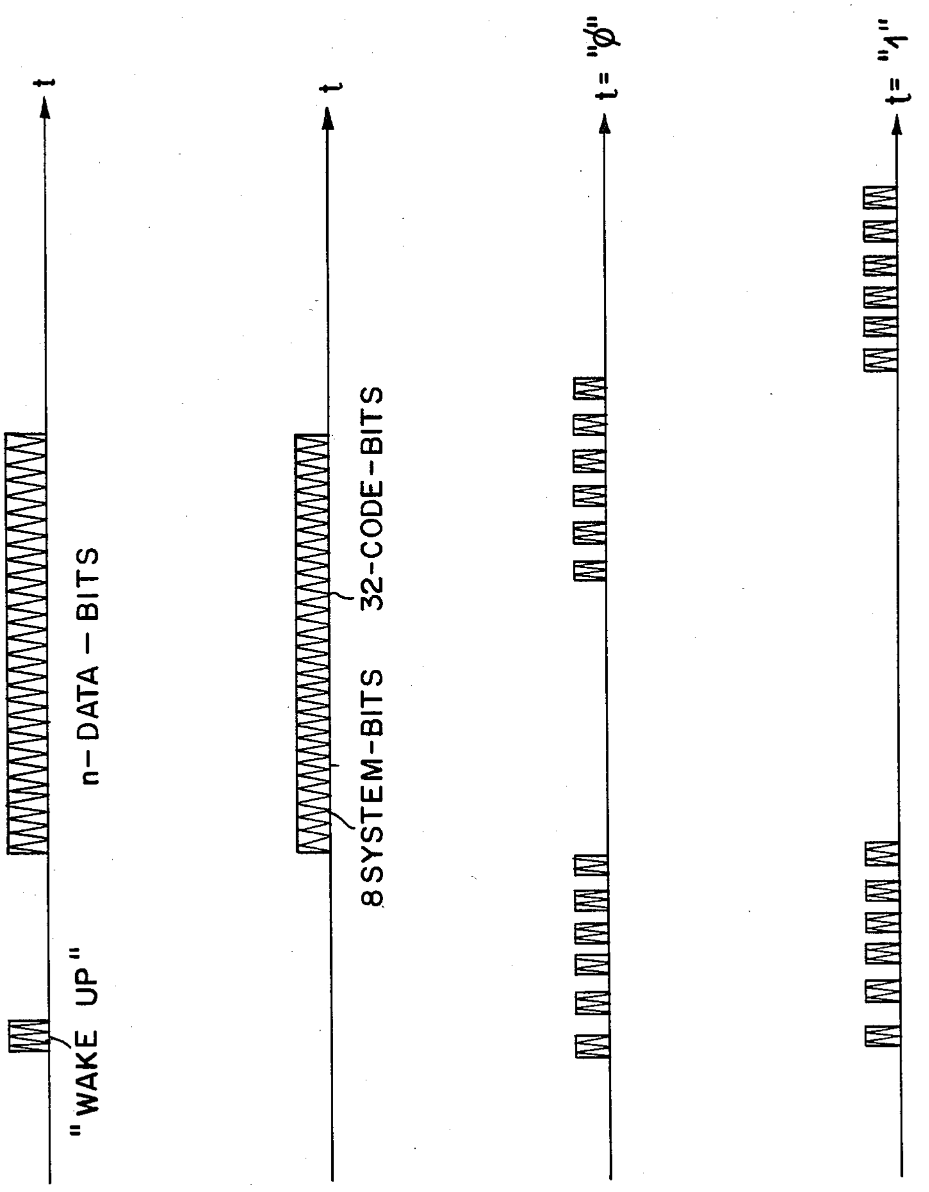
FIGS. 4A–D are diagrams to explain the transmission format of the code words.

FIG. 4 illustrates the transmission format. Upon actuation of key 6 of the transmitter, first a pre-pulse is emitted as a so-called wake-up pulse. This pulse turns the receiver into a state ready for reception. Subsequently the data proper are emitted in the form of a code word (FIG. 4A). The data are organized such that at first eight system bits are transmitted, followed by the CDW proper (FIG. 4B). The logical states "1" and "0" are represented in this case by a so-called pulse distance modulation. Several individual pulses are transmitted per bit during which the transmitting unit 8 in the form of the light emitting diode is switched on. As may be taken from FIGS. 4*c* and 4*d* there is a constant number of pulses each, for example six pulses at the beginning and end of each bit. The spacing in time between the pulse groups at the beginning and at the end of a bit determines whether the bit is a logical "1" or a logical "0".

In conclusion it should be noted that the two variants described above of the "polynomial generator" do not present a final list. Of course, other possibilities of linking or combining may be employed as well. For instance, all bits of the key code word and of the actual CDW may be linked rather than only those bits in which the key code word carries a "1". However, care should be taken that the encoding is so selected that no abbreviated polynomial rings occur or that they are only slightly abbreviated, as this will offer the greatest possible number of different encoding opportunities.

The method described of the polynomial generator may be regarded more generally as a kind of generation of a "pseudo random sequence". It is obvious that the invention also permits the use of any other known method to generate pseudo random sequences provided it is made sure that the transmitter and receiver provide the same pseudo random sequence, starting from one and the same key code word.

Furthermore, attention should be paid not to make the cycles of the number n and number m of steps too long in order not to block the receiver too long by foreign transmitters and in order not to reduce the probability to too low a level that an unauthorized person will not open the door with a functional generator which runs through all bit combinations. An additional measure which may be provided for this purpose is that the receiver becomes blocked for a given period of time of a few seconds after each CDW received. This will increase the length of time needed to run through all combinations to several years. In the case of resynchronization through the entire code supply (FIG. 3A), however, no artificial time delay should be provided.

The following special advantages of the invention should be emphasized:

The code words may be chosen to be of any desired length and yet the space requirement for memorization is very limited. Contrary to the state of the art, it is not necessary to provide for the fixed memorization of all code words. Even if someone knows the algorithm for determining a new code word and has recorded earlier code words without authorization, he cannot determine the next successive code word because he does not know the key code word. Also, he cannot make an unauthorized recording thereof, as it is not emitted through the "transmission path". The receiver becomes synchronized automatically with the transmitter without the need for any commands which must be sent along the transmission path and thus would become likely to be recorded. This eliminates the disadvantages of synchronization which are put up with in the case of the known forward stepping of the code. An extremely high degree of safety is reached against any decoding of the code words. Dummy operation of the transmitter and actuations of the receiver by foreign transmitters show no consequences which the user might feel. If a transmitter (key) gets lost, the receiver may be adapted in simple manner to a new transmitter. Therefore, once more the security is not impaired.

All technical details shown in the claims, specification, and drawings may be essential of the invention, either alone or in any desired combination.

I claim:

1. Electronic remote control apparatus for use in centrally controlled locking systems in motor vehicles comprising:

transmitter means acting as a key for transmitting, when actuated, a transmit code word in the form of an encoded multibit sequence, said transmit code word being developed as a function of a preassigned base code and changed in accordance with a predetermined sequence each time said transmitter means is actuated, said transmitter means including means for storing said preassigned base code;

means for actuating said transmitter means and means in said transmitter means responsive to each actuation of said transmitter means to change a previously transmitted code word in accordance with said predetermined sequence and transmit a next transmit code word in said predetermined sequence;

receiver means acting as a lock for receiving transmit code words in the form of encoded multibit sequences, said receiver means including means for storing a preassigned base code selected for a particular transmitter means having a corresponding preassigned base code;

means in said receiver means for developing a receive code word as a function of said stored preassigned base code and changing said receive code word in accordance with said predetermined sequence each time a valid transmit code word is received;

means in said receiver means for storing each transmit code word received by said receiver means and comparing each stored transmit code word received with a receive code word developed by said receiver means;

means in said receiver means for producing an actuation signal when said stored transmit code word corresponds to said receive code word developed by said receiver means and an out of sequence signal when no correspondence occurs;

means in said receiver means responsive to said out of sequence signal for producing N changed receive code words wherein each of said N changed receive code words is incremented by one step in said predetermined sequence from a preceding one of said N changed receive code words, said means for storing and comparing additionally acting to compare each of said N changed receive code wordss with said stored transmit code word, said means for producing an actuation signal producing said actuation signal when any one of said N changed receive code words corresponds to said stored transmit code word and a high level security signal when none of said N changed receive code words corresponds to said stored transmit code word; and means in said receiver means responsive to said high level security signal for producing M changed receive code words wherein each of said M changed receive code words is incremented by one step in said predetermined sequence from a preceding one of said M changed receive code words, said means for storing and comparing further acting to compare each of said M changed receive code words with said stored transmit code word in a first comparison and comparing a next one of said M changed receive code words with a next received transmit code word in a second comparison wherever said first comparison is indicative of identity between code words compared, said means for producing an actuation signal producing said actuation signal when a high level security signal is present only when said first and second comparisons both indicate identity between code words compared.

2. The electronic remote control apparatus according to claim 1 wherein said predetermined sequence in said transmitter means and in said receiver means is implemented by a pseudo-random sequence including an Exclusive Or linking of individual bit positions of said preassigned base code.

3. The electronic remote control apparatus according to claim 2 wherein said Exclusive Or linking of individual bit positions of said preassigned base code is logically implemented by Exclusive Or linking those bit positions of said preassigned base code having a 1 therein with corresponding bit positions of a previous transmit and receive code word and thereafter shifting all bits of the code word being formed one bit position in a closed ring.

4. The electronic remote control apparatus according to claim 3 wherein a control bit position is defined and Exclusive Or linking is carried out only if said control bit position contains a 1, said shifting of all bits in said code word being formed taking place when said control bit position contains a 0 until said control bit position receives a 1 or a predetermined number of shifts have been completed.

5. The electronic remote control apparatus according to claim 4 wherein said control bit position defined is selected as the highest order bit position.

6. The electronic remote control apparatus according to claim 1 additionally comprising temporary register means for storing each receive code word to be compared and means for transferring a receive code word for which a valid comparison has been obtained from said temporary register to memory means.

7. The electronic remote control apparatus according to claim 1 wherein said preassigned base code is stored in an electronically erasable programmable memory.

8. The electronic remote control apparatus according to claim 1 wherein M is unlimited when said locking system has been opened and another condition has been satisfied.

9. Electronic remote control apparatus for use in centrally controlled locking systems in motor vehicles comprising:

transmitter means acting as a key for transmitting, when actuated, a transmit code word in the form of an encoded multibit sequence, said transmit code word being developed as a function of a preassigned base code and changed in accordance with a predetermined sequence each time said transmitter means is actuated, said transmitter means including means for storing said preassigned base code;

means for actuating said transmitter means and means in said transmitter means responsive to each actuation of said transmitter means to change a previously transmitted code word in accordance with said predetermined sequence and transmit a next transmit code word in said predetermined sequence;

receiver means acting as a lock for receiving transmit code words in the form of encoded multibit sequences, said receiver means including means for storing a preassigned base code selected for a particular transmitter means having a corresponding preassigned base code;

means in said receiver means for developing a receive code word as a function of said stored preassigned base code and changing said receive code word in accordance with said predetermined sequence each time a valid transmit code word is received;

means in said receiver means for storing each transmit code word received by said receiver means and comparing each stored transmit code received with a receive code word developed by said receiver means;

means in said receiver means for producing an actuation signal when said stored transmit code word corresponds to said receive code word developed by said receiver means and another signal when no correspondence occurs; and means in said receiver means responsive to said another signal for producing M changed receive code words wherein each of said M changed receive code words is incremented by one step in said predetermined sequence from a preceding one of said M changed receive code words, said means for storing and comparing further acting to compare each of said M changed receive code words with said stored transmit code word in a first comparison and comparing a next one of said M changed receive code words with a next received transmit code word in a second comparison whenever said first comparison is indicative of identity between code words compared, said means for producing an actuation signal producing said actuation signal when a high level security signal is present only when said first and second comparisons both indicate identity between code words compared.

* * * * *